United States Patent
Ariannezhad et al.

(10) Patent No.: US 11,625,624 B2
(45) Date of Patent: Apr. 11, 2023

(54) VEHICLE-TO-EVERYTHING (V2X)-BASED REAL-TIME VEHICULAR INCIDENT RISK PREDICTION

(71) Applicant: Ford Global Technologies, LLC, Dearborn, MI (US)

(72) Inventors: Amin Ariannezhad, Troy, MI (US); Hamed Asadi, Troy, MI (US); Praveen Kumar Yalavarty, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 817 days.

(21) Appl. No.: 16/581,085

(22) Filed: Sep. 24, 2019

(65) Prior Publication Data
US 2021/0089938 A1 Mar. 25, 2021

(51) Int. Cl.
| | |
|---|---|
| G06N 20/00 | (2019.01) |
| G08G 1/0967 | (2006.01) |
| G08G 1/16 | (2006.01) |
| G08G 1/01 | (2006.01) |
| G06N 5/04 | (2023.01) |
| B60Q 9/00 | (2006.01) |

(52) U.S. Cl.
CPC ............ *G06N 5/04* (2013.01); *B60Q 9/008* (2013.01); *G06N 20/00* (2019.01); *G08G 1/0125* (2013.01); *G08G 1/096766* (2013.01); *G08G 1/164* (2013.01)

(58) Field of Classification Search
None
See application file for complete search history.

(56) References Cited

U.S. PATENT DOCUMENTS

| | | | | |
|---|---|---|---|---|
| 8,384,532 | B2 * | 2/2013 | Szczerba | G06F 18/253 |
| | | | | 345/7 |
| 9,153,131 | B2 * | 10/2015 | Santucci | G08G 1/0969 |
| 9,715,711 | B1 * | 7/2017 | Konrardy | G08G 1/09675 |
| 10,235,882 | B1 | 3/2019 | Aoude et al. | |
| 10,417,914 | B1 * | 9/2019 | Vose | G08G 1/0129 |
| 10,759,442 | B2 * | 9/2020 | Stenneth | B60W 40/101 |

(Continued)

FOREIGN PATENT DOCUMENTS

| | | |
|---|---|---|
| CN | 103646534 B | 12/2015 |
| CN | 108305505 A | 7/2018 |

(Continued)

*Primary Examiner* — Muhammad Adnan
(74) *Attorney, Agent, or Firm* — Brandon Hicks; Eversheds Sutherland (US) LLP (57) ABSTRACT

Systems, methods, and computer-readable media are described for performing real-time vehicular incident risk prediction using real-time vehicle-to-everything (V2X) data. A vehicular incident risk prediction machine learning model is trained using historical V2X data such as historical incident data and historical vehicle operator driving pattern behavior data as well as third-party data such as environmental condition data and infrastructure condition data. The trained machine learning model is then used to predict the risk of an incident for a vehicle on a roadway segment based on real-time V2X data relating to the roadway segment and/or vehicle operators on the roadway segment. A notification of a high risk of incident can then be sent to a V2X communication device of the vehicle to inform an operator of the vehicle.

20 Claims, 5 Drawing Sheets

(56) References Cited

U.S. PATENT DOCUMENTS

| | | | |
|---|---|---|---|
| 10,832,327 B1* | 11/2020 | Potter | B60W 40/09 |
| 11,348,460 B2* | 5/2022 | Brooks | G08G 1/096844 |
| 11,443,631 B2* | 9/2022 | Manohar | G08G 1/04 |
| 2005/0209769 A1* | 9/2005 | Yamashita | G08G 1/164 |
| | | | 340/907 |
| 2013/0282357 A1* | 10/2013 | Rubin | G08G 9/02 |
| | | | 703/22 |
| 2015/0310742 A1* | 10/2015 | Albornoz | G08G 1/096716 |
| | | | 340/905 |
| 2018/0222424 A1* | 8/2018 | Kodama | G08G 1/166 |
| 2019/0132719 A1* | 5/2019 | Mizutani | B60L 53/14 |
| 2019/0263395 A1* | 8/2019 | Hoetzer | B60W 50/14 |
| 2020/0229137 A1* | 7/2020 | Rubin | H04W 4/026 |

FOREIGN PATENT DOCUMENTS

| | | |
|---|---|---|
| CN | 108769950 A | 11/2018 |
| WO | 2018135605 A1 | 7/2018 |

* cited by examiner

VEHICLE-TO-EVERYTHING (V2X)-BASED REAL-TIME VEHICULAR INCIDENT RISK PREDICTION

FIELD

The present invention relates generally to real-time vehicular incident risk prediction, and more specifically, to using vehicle-to-everything (V2X) technologies to perform real-time vehicular incident risk prediction.

BACKGROUND

V2X communication involves the passing of information between a vehicle and any entity that may impact the vehicle or its operation. V2X encompasses various more specific types of vehicular communication systems including, for example, vehicle-to-infrastructure (V2I) communication; vehicle-to-network (V2N) communication; vehicle-to-vehicle (V2V) communication; vehicle-to-pedestrian (V2P) communication; vehicle-to-device (V2D) communication; and vehicle-to-grid (V2G) communication. There are two main types of V2X communication technologies: 1) wide local area network (WLAN) V2X communication, and 2) cellular-based V2X communication.

WLAN-based V2X communication utilizes radio communication to enable V2V and V2I communication and is standardized in Institute of Electrical and Electronics Engineers (IEEE) wireless communication protocol 802.11p. Wireless communication based on the IEEE 802.11p wireless communication protocol is referred to as Dedicated Short Range Communication (DSRC). Cellular V2X, on the other hand, utilizes cellular networks to enable various forms of V2X communication. Because cellular V2X supports wide area communication over a cellular network, it enables additional types of V2X communication beyond WLAN-based technology, such as V2N communication.

Data exchanged through V2X communication can be used to support various traffic management and safety applications. For instance, V2X communication can be used to provide collision warnings or traffic congestion warnings to vehicle operators. Existing safety applications that utilize V2X technologies, however, suffer from a number of technical drawbacks, technical solutions to which are described herein.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals can be used to identify similar components as well. Various embodiments may or may not utilize elements or components other than those illustrated in the drawings, and some elements and/or components may or may not be present in various embodiments. The use of singular terminology to describe a component or element can, depending on the context, encompass a plural number of such components or elements and vice versa.

DETAILED DESCRIPTION

Overview

Example embodiments of the invention include, among other things, systems, methods, computer-readable media, techniques, and methodologies for performing real-time vehicular incident risk prediction using real-time V2X data to provide a multi-factorial assessment of the risk of a vehicular incident for a vehicle travelling on a roadway segment such that an operator of the vehicle can be informed, in real-time, of the risk. Example embodiments of the invention are described herein in connection with use cases involving vehicles (e.g., cars, trucks, motorcycles, etc.) travelling on road surfaces. It should be appreciated, however, that embodiments of the invention are applicable to any scenarios in which vehicles are being operated under conditions that may pose a risk of a vehicular incident such as ships or other vessels navigating through water; planes or other aerial vehicles travelling through the air; and so forth. Further, a vehicular incident may include any incident involving a vehicle that can cause injury or damage to a person or thing such as a vehicle-vehicle collision; a vehicle-road infrastructure collision; a vehicle-pedestrian collision; or the like.

Vehicular crashes or other types of vehicular incidents are typically caused by complex interactions between several factors including, without limitation, drivers' driving patterns such as risky driving behavior; drivers' distractions; traffic flow characteristics; roadway geometry conditions; weather conditions; and so forth. The interactions between the multitude of such factors can, at times, increase the risk of vehicular incident on a roadway segment such that a small mistake or driver distraction can trigger an accident. Stated more generally, the probability that a vehicular incident occurs on any given roadway segment can vary over time as the factors influencing the risk of a vehicular incident change. For instance, driving on a slippery road surface at night under low visibility conditions would present a greater risk of incident than driving on the same road surface during daylight when the road surface is dry and visibility is good.

Example embodiments of the invention provide a technical solution to the technical problem that constantly changing conditions present for assessing the risk of vehicular incidents in real-time by using a trained machine learning prediction model to perform a real-time assessment of the risk of incident. Example embodiments of the invention initially train a vehicular incident risk prediction machine learning model using various forms of input data including V2X data indicative of historical vehicular incidents, historical drivers' driving patterns and driving behavior, and the like, as well as third-party data indicative of, for example, weather conditions, roadway geometry, and the like. Once trained, the machine learning model can be used to predict, in real-time, the risk of a vehicular incident occurring. More specifically, real-time V2X data, real-time third-party data, and the like can be input to the trained machine learning model to generate a vehicular incident risk value indicative of an instantaneous risk (or a risk over time) of a vehicular incident occurring on a particular roadway segment. In example embodiments, when the vehicular incident risk value meets a threshold value—indicating a high incident risk level—a notification can be sent to a communication device of a vehicle to provide the vehicle operator with a real-time warning of the high incident risk level, In addition, the specific factors that are causing the high risk level such as weather conditions, drivers with historically risky driving behavior concurrently operating vehicles on the roadway segment, or the like can optionally be sent to the communication device and presented to the vehicle operator.

By training a vehicular incident risk prediction machine learning model and utilizing the trained model to perform a real-time vehicular incident risk assessment and provide drivers with real-time warnings during scenarios involving a high risk of vehicular incidents, example embodiments provide proactive techniques for calculating and informing drivers of crash risk in real-time, and thus, serve to mitigate crash risk; smooth traffic flow; enhance road safety; and improve roadway mobility. Thus, example embodiments provide a technical solution over conventional collision avoidance systems that are merely reactive in nature (e.g., provide a warning of an obstacle up ahead) and that fail to proactively assess and inform a vehicle operator of the real-time multi-factorial risk of a vehicular incident occurring.

In addition, example embodiments of the invention rely on real-time V2X data with high resolution as input to the trained machine learning model to predict vehicular incident risk in real-time, which represents a technological improvement over conventional methodologies for crash risk prediction that rely on fixed sensors on roadways as a source for collecting traffic data. Such fixed sensors are deployed only on a limited number of roadways (e.g., some freeways), are placed an average distance of 0.5-1 mile apart from one another, and report traffic data periodically every 20-30 seconds. Conventional crash risk prediction techniques that utilize this type of low frequency, low granularity data produce crash risk prediction models with a much lower accuracy than example embodiments of the invention that rely on real-time cellular V2X data that is collected from vehicles continuously with respect to any type of roadway. As a result, example embodiments of the invention produce a crash risk predictive capability that is significantly more accurate than conventional techniques that rely on fixed sensors for traffic-related data. In addition, example embodiments of the invention provide real-time in-vehicle notifications of high vehicular incident risk, which conventional solutions are incapable of doing. Moreover, while V2X data has become more commonly used in connection with various traffic management and safety applications including incident and congestion monitoring, advanced traveler information systems, and performance measurement, real-time V2X data such as real-time cellular V2X data has not previously been used to provide real-time vehicular incident risk prediction and real-time, in-vehicle notifications of high risk scenarios and driving conditions. Thus, for at least the aforementioned reasons, example embodiments of the invention provide a technological improvement over conventional crash risk prediction approaches.

Illustrative Embodiments

Figure 1:
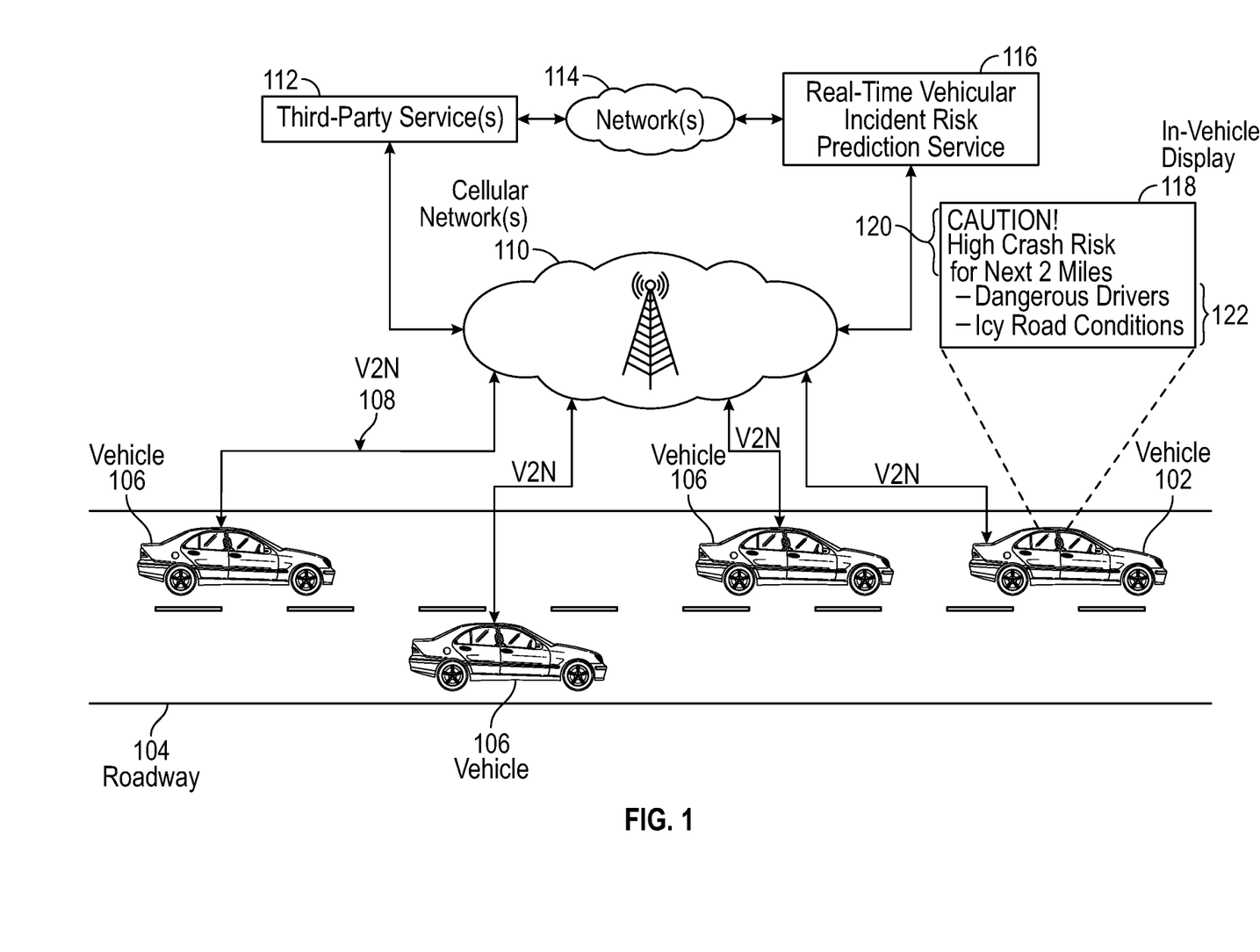
FIG. 1 is a block diagram that schematically depicts real-time vehicular incident risk prediction utilizing cellular vehicle-to-everything (V2X) communication technology in accordance with one or more example embodiments of the invention.

Referring now to illustrative embodiments of the invention, FIG. 1 depicts a scenario involving multiple vehicles travelling along a roadway segment 104. The vehicles include representative vehicle 102 (in connection with which real-time vehicular incident risk prediction utilizing cellular V2X data will be described) as well as multiple other vehicles 106 travelling on the same roadway segment 104 as the vehicle 102. The vehicle 102 as well as each of the vehicles 106 may include a respective communication device (not shown in FIG. 1) capable of sending and receiving V2X data communications. More specifically, the respective communication device of each vehicle may be capable of sending and receiving vehicle-to-network (V2N) communications 108 via one or more cellular networks 110. The cellular network(s) 110 may include any currently operational cellular network such as a Global System for Mobile Communications (GSM) network, a 3G Universal Mobile Telecommunications System (UMTS) network, or a 4G Long Term Evolution (LTE) network, as well as, cellular networks that currently being rolled out and/or which may become operational in the future such as a 5G network. It should be appreciated that in addition to V2N communications, the communication devices of the vehicles depicted may also be capable of sending and receiving other forms of V2X communication such as V2V communication, V2I communication, and so forth.

As will be described in more detail in reference to FIGS. 2-4, a real-time vehicular risk prediction service 116 (which may be a cloud-based service) may be provided. In example embodiments, the real-time vehicular risk prediction service 116 is configured to make a real-time assessment of the risk of a vehicular incident occurring on a roadway segment (e.g., the roadway segment 104) using, for example, the real-time V2N data 108 and send a notification to a communication device of a vehicle (e.g., vehicle 102) when the risk of a vehicular incident is determined to be high. In addition to the real-time V2N data 108, service 116 may also utilize data received from one or more third-party services 112 to perform the real-time vehicular incident risk assessment. The third-party data may be received from the third-party service(s) 112 via one or more networks 114, which may include any suitable private and/or public network(s). The third-party data may include, without limitation, environmental condition data such as weather data; infrastructure condition data indicative of a geometry of the roadway segment, damage to the roadway segment, obstacles present on the roadway segment, or the like; and so forth.

In example embodiments, the service 116 may execute a trained machine learning model on the real-time V2N data 108 as well as the third-party data to produce a vehicular incident risk prediction value. The third-party data may be received by the service 116 via the network(s) 114 and may include, without limitation, the illustrative types of data described earlier. The real-time V2N data 108 may include various types of V2N data that may be communicated to the service 116 via the cellular network(s) 110. For instance, the V2N data 108 received in real-time may include drivers' driving pattern data, which may be indicative of vehicle speed/acceleration; vehicle vibrational characteristics; vehicle directional data; vehicle braking data; and so forth, all of which may provide insight into the degree to which a vehicle operator engages in safe or reckless driving behaviors.

The drivers' driving pattern data may be received in real-time from a vehicle for which a risk prediction is being performed (e.g., the vehicle 102) as well as from other vehicles 106 present on the same roadway segment 104 at the same time. It should be appreciated that the service 116 may perform a vehicular incident risk prediction for the road segment 104 and multiple vehicles simultaneously. As another non-limiting example, the V2N data 108 may include real-time traffic flow data indicative of traffic flow/congestion on the roadway segment 104; average vehicle speed on the roadway segment 104; and so forth. As will be described in more detail later in this disclosure, similar types of historical V2N data and historical third-party data may be used as ground-truth data to initially train a machine learning model to perform the real-time vehicular incident risk prediction.

In example embodiments, the vehicular incident risk prediction value obtained from application of the trained machine learning model to the real-time V2N and third-party data may be compared against a threshold value. If the vehicular incident risk prediction value meets the threshold value, this may indicate a high vehicular incident risk level. As used herein, a first value meeting a second value may include the first value being strictly greater than the second value; the first value being greater than or equal to the second value; the first value being strictly less than the second value; or the first value being less than or equal to the second value. In example embodiments, the service 116 may a send a notification to a communication device of a vehicle (e.g., the vehicle 102) when the vehicular incident risk prediction value meets the threshold value, thereby indicating a high risk of a vehicular incident occurring.

The notification may include various information indicative of the high risk of a vehicular incident. The information may be presented to a vehicle operator via, for example, an in-vehicle display 118. The information may include, for instance, a real-time warning 120 that contains one or more terms, phrases, symbols, or other indicia indicative of the presence of a high risk of a vehicular incident occurring. In example embodiments, the warning 120 may further specify a distance over which the dangerous conditions are present on the roadway segment 104; a duration of time during which the dangerous conditions are present; or the like. In addition, in example embodiments, more detailed information 122 may also be presented to the vehicle operator via the in-vehicle display 118.

The more detailed information 122 may include an identification of specific factors or conditions that contribute to the high vehicular incident risk including, without limitation, the presence of drivers with a demonstrated pattern of unsafe driving on the roadway segment 104; specific dangerous weather conditions (e.g., icy/wet roads, fog, etc.); obstacles present in the roadway segment 104 that increase the risk of a vehicular incident occurring (e.g., construction equipment, lane closures, debris, etc.); damage to infrastructure and/or surface condition of the roadway segment 104 (e.g., potholes); dangerous road geometry (e.g., sharp curves); and so forth. Thus, in example embodiments, a vehicle operator is presented not only with a real-time indication when the risk of a vehicular incident occurring is high, but also with specific information identifying the factors/conditions that are contributing to that high risk. In this manner, a vehicle operator is provided with the opportunity to adjust her driving habits to mitigate the high risk of a vehicular incident occurring, potentially taking specific measures to counteract the specific factors/conditions that are contributing to the high risk.

Figure 2:
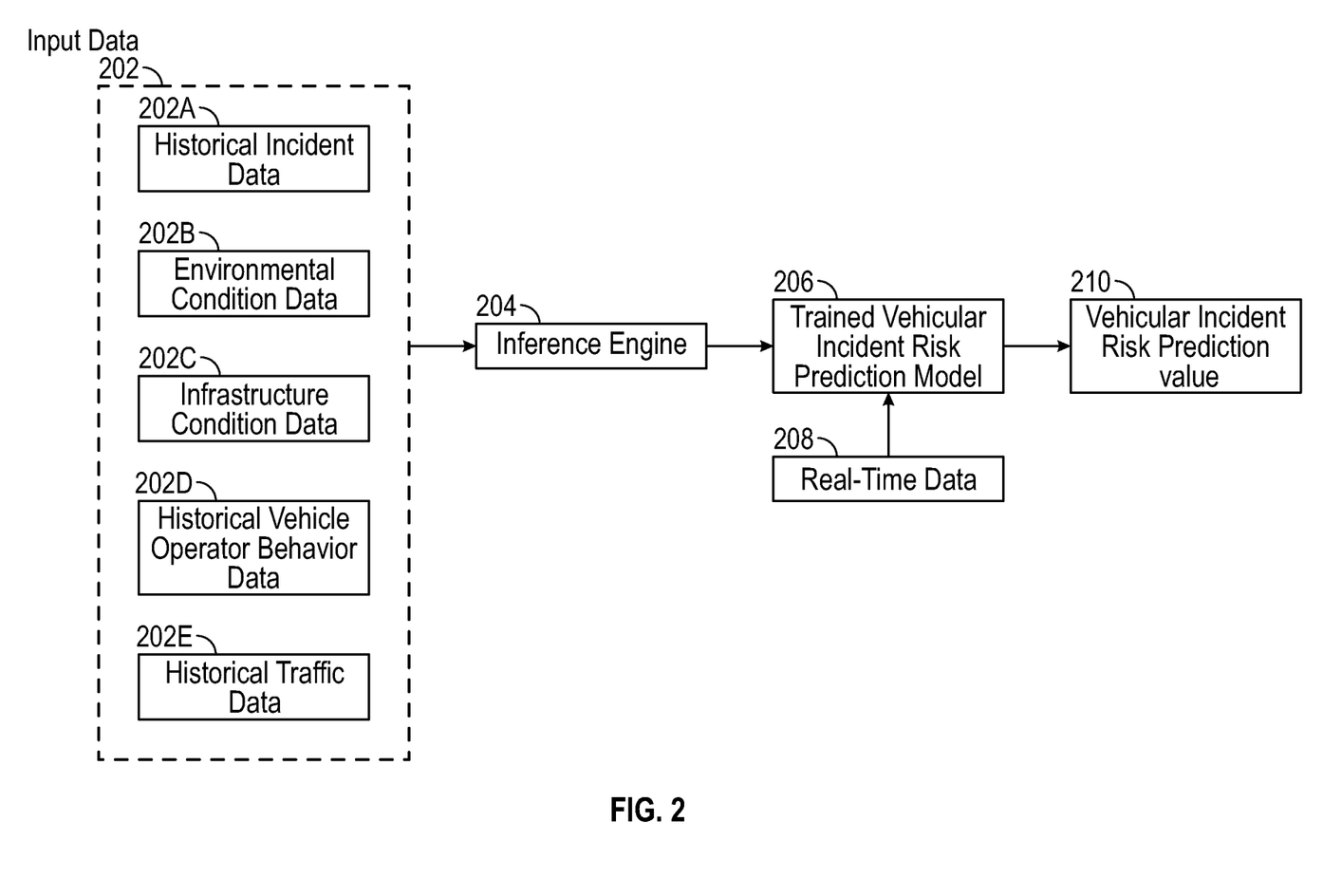
FIG. 2 is a hybrid data flow and block diagram that schematically depicts training of a vehicular incident risk prediction machine learning model and use of the trained model to provide a vehicular incident risk prediction based on, among other things, real-time cellular V2X data in accordance with one or more example embodiments of the invention.

FIG. 2 is a hybrid data flow and block diagram that schematically depicts training of a vehicular incident risk prediction machine learning model and use of the trained model to provide a vehicular incident risk prediction based on, among other things, real-time cellular V2X data. In example embodiments, the components depicted in FIG. 2 may form part of the service 116 depicted in FIG. 1. FIG. 3 is a process flow diagram of an illustrative method 300 for training the vehicular incident risk prediction machine learning model. FIG. 4 is a process flow diagram of an illustrative method 400 for using the trained vehicular incident risk prediction machine learning model to predict an incident risk based on, among other things, real-time cellular V2X data, and provide a vehicle operator with a notification of the incident risk. FIGS. 3 and 4 will each be described in conjunction with FIGS. 1 and 2 hereinafter.

Each operation of the method 300 and/or the method 400 can be performed by one or more of the program modules/engines depicted in FIG. 2 or FIG. 5, whose operation will be described in more detail hereinafter. These program modules can be implemented in any combination of hardware, software, and/or firmware. In certain example embodiments, one or more of these program modules can be implemented, at least in part, as software and/or firmware modules that include computer-executable instructions that when executed by a processing circuit cause one or more operations to be performed. A system or device described herein as being configured to implement example embodiments of the invention can include one or more processing circuits, each of which can include one or more processing units or nodes. Computer-executable instructions can include computer-executable program code that when executed by a processing unit can cause input data contained in or referenced by the computer-executable program code to be accessed and processed to yield output data.

Figure 3:
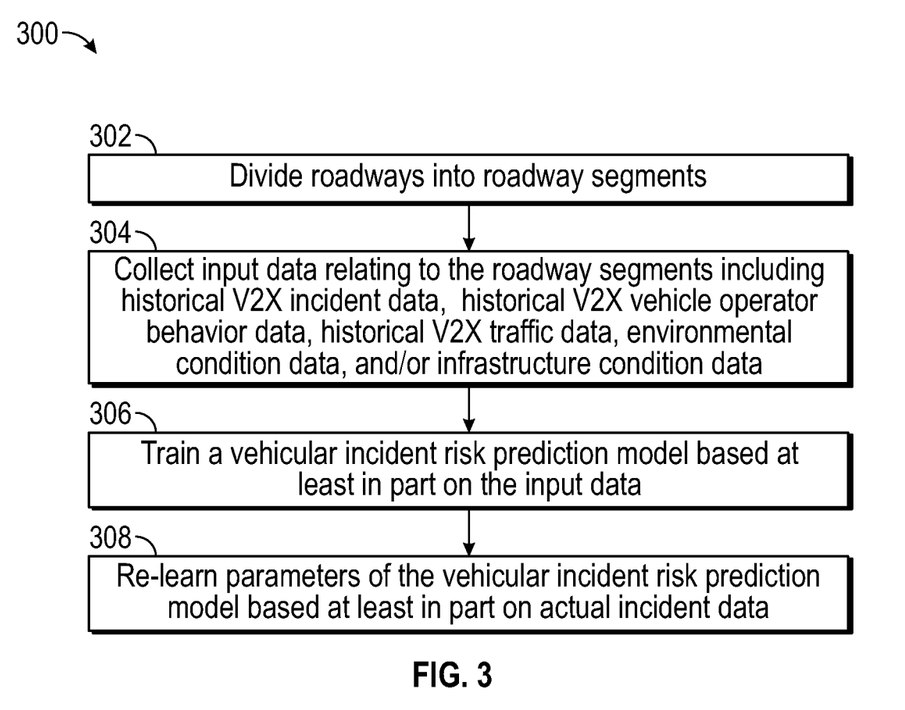
FIG. 3 is a process flow diagram of an illustrative method for training a vehicular incident risk prediction machine learning model in accordance with one or more example embodiments of the invention.

Referring first to FIG. 3, at block 302 of the method 300, a collection of roadways may be divided into roadway segments, which may include, for example, roadway segment 104 shown in FIG. 1. Each roadway segment may represent a discrete portion of a roadway such as, for example, a section of an interstate between two particular mile markers. Each roadway segment of a given roadway may be equal in length or two or more roadway segments may have different lengths. In example embodiments, segmenting the roadways into roadway segments may result in greater accuracy for the vehicular incident risk prediction with respect to a vehicle's instantaneous location. In particular, making the vehicular risk prediction based on V2X data relating to a particular roadway segment rather than an entire roadway allows for high risk conditions—which may be present only intermittently along a roadway—to be identified and assessed with greater granularity and accuracy.

Referring now to FIG. 3 in conjunction with FIG. 2, at block 304 of the method 300, various input data 202 relating to the segmented roadway segments may be collected. In example embodiments, the input data 202 may include various types of historical V2X data such as historical incident data 202A, historical vehicle operator behavior data 202D, and historical traffic data 202E. The historical incident data 202A may indicate, without limitation, a number and/or rate of vehicular incidents for the various roadway segments; vehicle operational characteristics for vehicles involved in incidents such as vehicle speed/acceleration, braking distances maintained, number or rate of airbag deployments, etc.; extent of vehicular damage caused by vehicular incidents; number and extent of personal injuries results from vehicular incidents; and so forth. In example embodiments, at least a portion of the historical incident data 202A may be received from the third-party service(s) 112.

The historical vehicle operator behavior data 202D may be indicative, without limitation, of historical driving patterns and behavior of vehicle operators including average speed; average deviation between actual speed and speed limit; acceleration profile; average speed in relation to roadway geometry/curvature; braking rate; average braking distance maintained; and so forth. In addition, the historical vehicle operator behavior data 202D may include data indicative of a vehicle operator's tendency towards distraction such as gaze tracking data indicative of changes in a user's gaze direction; data indicative of phone calls, texting, or in-vehicle communication during vehicle operation; data indicative of radio usage during vehicle operation; and so forth. The historical V2X traffic data 202E may include, without limitation, average speeds of vehicle on roadway segments; standard deviation of speed of vehicles; traffic density and number of vehicles on roadway segments; and the like.

In example embodiments, the input data 202 may further include environmental condition data 202B and infrastructure condition data 202C. The environmental condition data 202B may include, without limitation, weather data indicative of historical weather-related conditions for the roadway segments; data indicative of visibility levels (which may be related to weather conditions and/or amount of daylight available, for instance); and so forth. The infrastructure condition data 202C may include, without limitation, data indicative of geometry of roadway segments (e.g., number of curves in a roadway segment, extent of curvature present in a roadway segment, etc.); data indicative of roadway segment surface conditions (e.g., presence/size of potholes or other damage to a road surface); data indicative of potential obstacles present in roadway segments (e.g., debris, construction equipment, etc.); and so forth.

At block 306 of the method 300, computer-executable instructions of an inference engine 204 may be executed to receive the input data 202 and train a vehicular incident risk prediction machine learning model based on the input data 202 to obtain a trained model 206. The machine learning model may utilize any suitable machine learning methodology or construct including, without limitation, deep neural networks, statistical machine learning algorithms, or the like.

More specifically, at block 306, the inference engine 204 may train the machine learning model using the historical input data 202, which may indicate, for example, historical driving patterns/behavior of vehicle operators, historical traffic flow, historical vehicular incidents, historical weather conditions, and infrastructure conditions for each of the roadway segments. In this manner, the trained model 206 can then be used to predict the real-time risk of a vehicular incident for a new vehicle operator and/or any roadway segment, even those for which historical data was not evaluated during the training phase. That is, the trained model 206 can accurately determine the risk of a vehicular incident occurring for a new vehicle operator or any roadway segment based on similarities between real-time V2X traffic data and/or real-time weather/infrastructure condition data corresponding to the new operator and/or roadway segment and historical data evaluated during the training phase for vehicle operators who demonstrated similar driving patterns/behavior and/or roadway segments that have similar weather/infrastructure/traffic conditions.

At block 308 of the method 300, computer-executable instructions of the inference engine 204 may be executed to re-learn parameters of the trained vehicular incident risk prediction model 206 based on actual vehicular incident data. More specifically, as vehicular incident risk predictions are made by the trained model 206, those predictions may be compared against actual incident data to determine whether conditions deemed to pose a high risk of an incident and/or conditions deemed not to pose a high risk resulted in an actual incident. In this manner, the predictive capabilities of the trained model 206 can be iteratively improved based on actual incident data.

Figure 4:
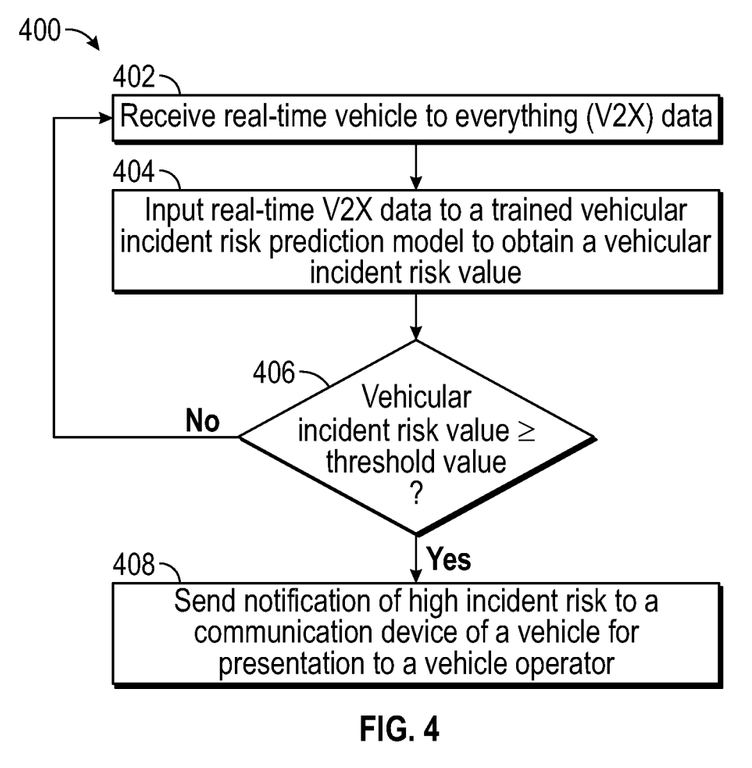
FIG. 4 is a process flow diagram of an illustrative method for using a trained vehicular incident risk prediction machine learning model to predict an incident risk based on, among other things, real-time cellular V2X data, and provide a vehicle operator with a notification of the incident risk in accordance with one or more example embodiments of the invention.

FIG. 4 depicts an illustrative method 400 for utilizing the trained model 206 to provide real-time vehicular incident risk prediction and notification. Referring now to FIG. 4 in conjunction with FIGS. 1 and 2, at block 402 of the method 400, the vehicular incident risk prediction service 116 may receive V2X data 208 in real-time from various communication devices associated with vehicles travelling on a roadway segment (e.g., the vehicles 106 and the vehicle 102 travelling on the roadway segment 104). The real-time V2X data 208 may include, for example, cellular V2N communications received from communication devices of the vehicles over the cellular network(s) 110. Such V2N communications may include, without limitation, vehicle speed/acceleration data; vehicle braking data; data indicative of distances between vehicles; traffic flow data; data indicative of vehicle operator driving patterns/behavior; and so forth. It should be appreciated that the V2X data 208 received at block 402 may include other forms of data other than V2N data such as V2V data and V2I data. Further, in addition to the real-time V2X data 208, various third-party data may also be received at block 402 including, for example, real-time weather data; infrastructure/road surface condition and geometry data; and so forth.

At block 404 of the method 400, the data received at block 402 including the real-time V2X data as well as any third-party data that is received may be provided as input to the trained vehicular incident risk prediction model 206 to obtain a vehicular incident risk prediction value 210 indicative of a vehicular incident risk level for a given vehicle (e.g., the vehicle 102) that corresponds to the particular set of conditions present on the roadway segment 104. In example embodiments, the historical and/or real-time driving behavior of a vehicle operator with respect to whom a vehicular incident risk prediction is being made may impact the vehicular incident risk prediction value 210 that is calculated. For instance, all other conditions being equal (e.g., the driving patterns/behavior of other vehicle operators, weather conditions, infrastructure conditions, etc.), a lower risk value may be calculated for a driver who historically exhibits and/or is currently exhibiting safer driving behavior than for a driver who historically exhibits and/or is currently exhibiting more reckless driving behavior. In example embodiments, the vehicle operator and/or the roadway segment for which a risk prediction is made may be one for which no training data was available. In such a scenario, the risk prediction value may be determined based on similarities between the new vehicle operator driving behavior and/or the roadway segment and vehicle operators and/or roadway segments for which corresponding historical data was used to train the machine learning model.

At block 406 of the method 400, the calculated vehicular incident risk prediction value 210 may be compared to a threshold value to determine whether the risk value 210 meets the threshold value (e.g., is greater than or equal to the threshold value), and thus, whether the risk level represented by the risk value 210 can be categorized as high risk. The threshold value may be a predetermined value or one that dynamically changes as the parameters of the trained model 206 are re-learned based on actual incident data.

In response to a negative determination at block 406, the method 400 may return to block 402, where additional real-time V2X data may be received. In particular, the method 400 may be performed in real-time on a continuous stream of real-time V2X data such that a real-time risk prediction can be performed at any time with respect to any vehicle operator and/or roadway segment. On the other hand, in response to a positive determination at block 406, the method 400 may proceed to block 408, where the service 116 may send a notification of the presence of a high risk of a vehicular incident occurring to a communication device of a vehicle (e.g., the vehicle 102) such that information identifying the high risk and potentially more detailed information relating to factors contributing to the high risk can be presented to a vehicle operator of the vehicle.

In example embodiments, the information presented to the vehicle operator based on the notification sent at block 408 may include, without limitation, the real-time warning 120 depicted in FIG. 1 that contains one or more terms, phrases, symbols, or other indicia indicative of the presence of a high risk of a vehicular incident occurring. Further, in example embodiments, the warning 120 may further specify a distance over which the dangerous conditions are present on the roadway segment 104; a duration of time during which the dangerous conditions are present; or the like. In addition, in example embodiments, more detailed information 122 may also be presented to the vehicle operator including, for example, an identification of specific factors or conditions that contribute to the high vehicular incident risk such as the presence of drivers with a demonstrated pattern of unsafe driving on the roadway segment 104; specific dangerous weather conditions (e.g., icy/wet roads, fog, etc.); obstacles present in the roadway segment 104 that increase the risk of vehicular incident occurring (e.g., construction equipment, lane closures, debris, etc.); damage to infrastructure and/or surface condition of the roadway segment 104 (e.g., potholes); dangerous road geometry (e.g., sharp curves); and so forth.

In example embodiments, in addition to, or in lieu of, presenting the information indicative of a high risk of a vehicular incident occurring to a vehicle operator via the in-vehicle display 118, the information may also be presented audibly or in a tactile manner (e.g., steering wheel vibration when a vehicle speed exceeds a threshold speed in dangerous driving conditions). Further, in example embodiments, the vehicular incident risk prediction value calculated by the trained model 206 may be compared against multiple threshold values at block 406 to determine a risk category corresponding to the predicted value. For instance, the threshold values may delineate different ranges of vehicular incident risk levels, and the level of risk that is present may be determined based on which threshold values the predicted value lies between. In example embodiments, a vehicle operator may be notified of the real-time vehicular incident risk level even if the risk prediction value corresponds to a low or moderate level of risk. For instance, in example embodiments, indicia displayed to a vehicle operator that depicts a current risk level may dynamically change to reflect changes in the risk level as a vehicle travels along a roadway segment.

Also, in example embodiments, a vehicle operator may be provided with a capability to customize the amount of risk-related information and/or the scenarios under which such information is presented. For instance, a vehicle operator may specify, via a selection of in-vehicle settings for example, that notifications of high-risk conditions should only be presented for roadway segments that have been travelled less than a threshold number of times by the vehicle operator. As another non-limiting example, a vehicle operator may specify that notification of high-risk conditions should only be presented if certain environmental conditions are present. For instance, a vehicle operator may only allow notifications when wet/icy road surface conditions are present or when the vehicle is being operated at night or under poor visibility conditions.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this invention.

Figure 5:
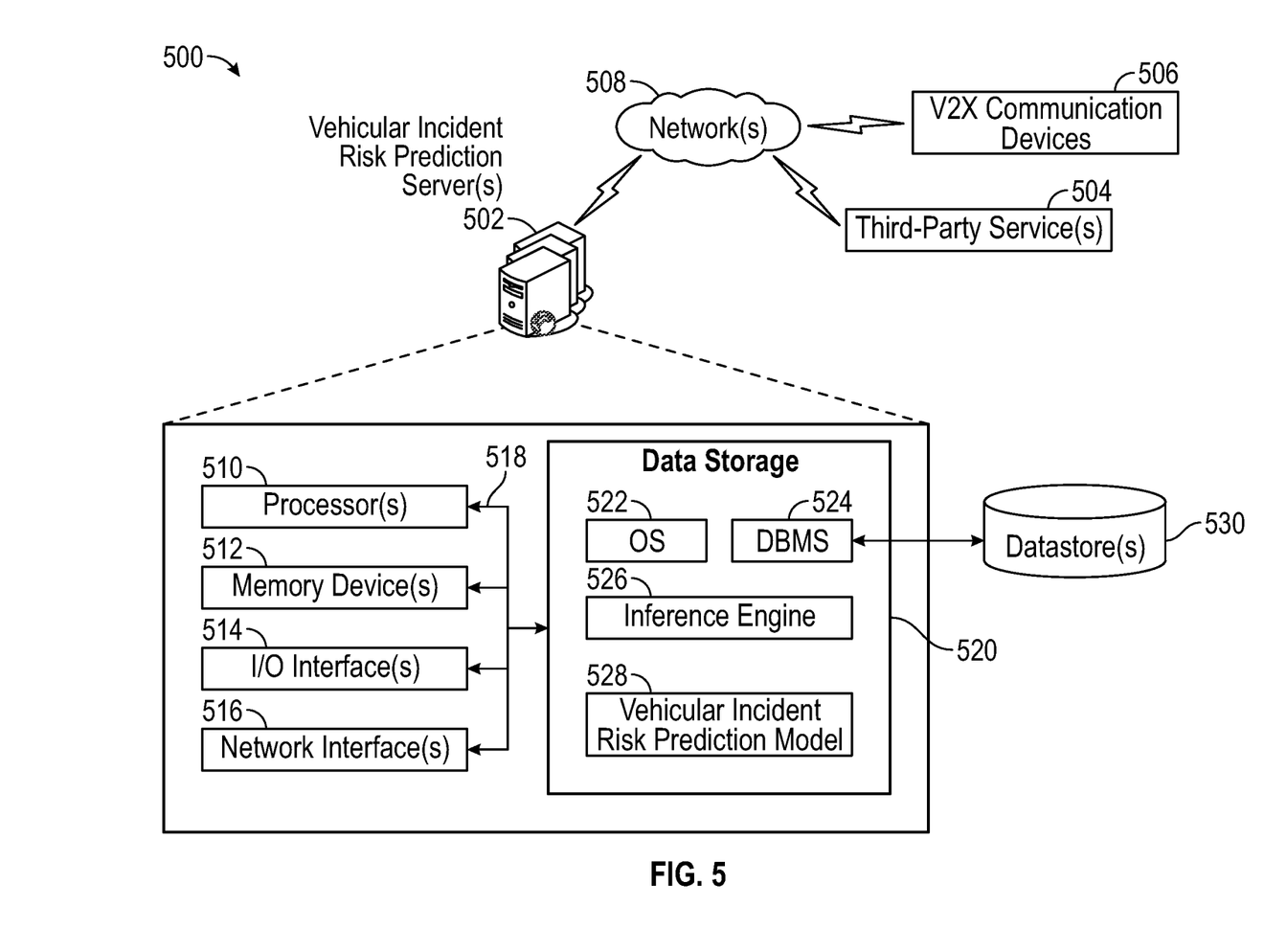
FIG. 5 is a schematic diagram of an illustrative networked architecture configured to implement one or more example embodiments of the invention.

FIG. 5 is a schematic diagram of an illustrative networked architecture 500 configured to implement one or more example embodiments of the invention. The networked architecture 500 can include one or more vehicular incident risk prediction (VIRP) servers 502 communicatively coupled via one or more networks 508 to various V2X communication devices 506 and one or more third-party services 504. The V2X communication devices 506 may include any suitable device having a radio and an antenna configured to send and receive V2X data communications. The V2X communication devices 506 may be provided as part of in-vehicle communication systems; integrated with roadway infrastructure; or the like. The third-party service(s) 504 may include any of the types of services described in connection with the third-party service(s) 112 including, for example, a weather service, a roadway infrastructure services, or the like. While the VIRP server(s) 502, V2X communication devices 506, and/or the third-party service(s) 504 may be described herein in the singular, it should be appreciated that multiple instances of any such component can be provided and functionality described in connection any particular component can be distributed across multiple instances of such a component. In certain example embodiments, functionality described herein in connection with any given component of the architecture 500 can be distributed among multiple components of the architecture 500. For example, at least a portion of the functionality provided by the VIRP server(s) 502 may be distributed among one or more V2X communication devices 506.

The network(s) 508 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 508 can have any suitable communication range associated therewith and can include, for example, global networks (e.g., the Internet), metropolitan area networks (MANs), wide area networks (WANs), local area networks (LANs), or personal area networks (PANs). In addition, the network(s) 508 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the VIRP server 502 can include one or more processors (processor(s)) 510, one or more memory devices 512 (generically referred to herein as memory 512), one or more input/output ("I/O") interface(s) 514, one or more network interfaces 516, and data storage 520. The VIRP server 502 can further include one or more buses 518 that functionally couple various components of the VIRP server 502.

The bus(es) 518 can include at least one of a system bus, a memory bus, an address bus, or a message bus, and can permit the exchange of information (e.g., data (including computer-executable code), signaling, etc.) between various components of the device 400. The bus(es) 518 can include, without limitation, a memory bus or a memory controller, a peripheral bus, an accelerated graphics port, and so forth. The bus(es) 518 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 512 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 512 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 512 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 520 can include removable storage and/or non-removable storage including, but not limited to, magnetic storage, optical disk storage, and/or tape storage. The data storage 520 can provide non-volatile storage of computer-executable instructions and other data. The memory 512 and the data storage 520, removable and/or non-removable, are examples of computer-readable storage media (CRSM) as that term is used herein.

The data storage 520 can store computer-executable code, instructions, or the like that can be loadable into the memory 512 and executable by the processor(s) 510 to cause the processor(s) 510 to perform or initiate various operations. The data storage 520 can additionally store data that can be copied to memory 512 for use by the processor(s) 510 during the execution of the computer-executable instructions. Moreover, output data generated as a result of execution of the computer-executable instructions by the processor(s) 510 can be stored initially in memory 512 and can ultimately be copied to data storage 520 for non-volatile storage.

More specifically, the data storage 520 can store one or more operating systems (O/S) 522; one or more database management systems (DBMS) 524 configured to access the memory 512 and/or one or more external data store(s) 530 (potentially via a network 508); and one or more program modules, applications, engines, computer-executable code, scripts, or the like such as, for example, an inference engine 626 and a trained VIRP model 528. Any of these modules can, in turn, include various sub-modules. Any of the components depicted as being stored in data storage 520 can include any combination of software, firmware, and/or hardware. The software and/or firmware can include computer-executable instructions (e.g., computer-executable program code) that can be loaded into the memory 512 for execution by one or more of the processor(s) 510 to perform any of the operations described earlier in connection with correspondingly named modules.

Although not depicted in FIG. 5, the data storage 520 can further store various types of data utilized by components of the VIRP server 502 (e.g., V2X data, third-party data, incident risk prediction values, threshold values, etc.). Any data stored in the data storage 520 can be loaded into the memory 512 for use by the processor(s) 510 in executing computer-executable instructions. In addition, any data stored in the data storage 520 can potentially be stored in the data store(s) 530 and can be accessed via the DBMS 524 and loaded in the memory 512 for use by the processor(s) 510 in executing computer-executable instructions.

The processor(s) 510 can be configured to access the memory 512 and execute computer-executable instructions loaded therein. For example, the processor(s) 510 can be configured to execute computer-executable instructions of the various program modules, applications, engines, or the like of the VIRP server 502 to cause or facilitate various operations to be performed in accordance with one or more embodiments of the invention. The processor(s) 510 can include any suitable processing unit capable of accepting data as input, processing the input data in accordance with stored computer-executable instructions, and generating output data. The processor(s) 510 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 510 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 510 can be made capable of supporting any of a variety of instruction sets.

Referring now to other illustrative components depicted as being stored in the data storage 520, the O/S 522 can be loaded from the data storage 520 into the memory 512 and can provide an interface between other application software executing on the VIRP server 502 and hardware resources of the VIRP server 502. More specifically, the O/S 522 can include a set of computer-executable instructions for managing hardware resources of the VIRP server 502 and for providing common services to other application programs. In certain example embodiments, the O/S 522 can include or otherwise control execution of one or more of the program modules depicted as being stored in the data storage 520. The O/S 522 can include any operating system now known or which can be developed in the future including, but not limited to, any server operating system, any mainframe operating system, or any other proprietary or non-proprietary operating system.

The DBMS 524 can be loaded into the memory 512 and can support functionality for accessing, retrieving, storing, and/or manipulating data stored in the memory 512, data stored in the data storage 520, and/or data stored in the external data store(s) 530. The DBMS 524 can use any of a variety of database models (e.g., relational model, object model, etc.) and can support any of a variety of query languages. The DBMS 524 can access data represented in one or more data schemas and stored in any suitable data repository. The data store(s) 530 can store V2X data, third-party data, incident risk prediction values, threshold values, and so forth. The data store(s) 530, which can be accessible by the VIRP server 502 via the DBMS 524, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the VIRP server 502, the input/output (I/O) interface(s) 514 can facilitate the receipt of input information by the VIRP server 502 from one or more I/O devices as well as the output of information from the VIRP server 502 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the VIRP server 502 or can be separate. The I/O devices can further include, for example, any number of peripheral devices such as data storage devices, printing devices, and so forth.

The I/O interface(s) 514 can also include an interface for an external peripheral device connection such as universal serial bus (USB), FireWire, Thunderbolt, Ethernet port or other connection protocol that can connect to one or more networks. The I/O interface(s) 514 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The VIRP server 502 can further include one or more network interfaces 516 via which the VIRP server 502 can communicate with any of a variety of other systems, platforms, networks, devices, and so forth. The network interface(s) 516 can enable communication, for example, with one or more other devices via one or more of the network(s) 508.

It should be appreciated that the program modules depicted in FIG. 5 as being stored in the data storage 520 are merely illustrative and not exhaustive and that processing described as being supported by any particular module can alternatively be distributed across multiple modules, engines, or the like, or performed by a different module, engine, or the like. In addition, various program module(s), engine(s), script(s), plug-in(s), Application Programming Interface(s) (API(s)), or any other suitable computer-executable code hosted locally on the VIRP server 502 and/or hosted on other computing device(s) (e.g., a V2X communication device) accessible via one or more of the network(s) 508, can be provided to support functionality provided by the modules depicted in FIG. 5 and/or additional or alternate functionality. Further, functionality can be modularized in any suitable manner such that processing described as being performed by a particular module can be performed by a collection of any number of program modules, or functionality described as being supported by any particular module can be supported, at least in part, by another module. In addition, program modules that support the functionality described herein can be executable across any number of servers 502 in accordance with any suitable computing model such as, for example, a client-server model, a peer-to-peer model, and so forth. In addition, any of the functionality described as being supported by any of the modules depicted in FIG. 5 can be implemented, at least partially, in hardware and/or firmware across any number of devices or servers.

It should further be appreciated that the VIRP server 502 can include alternate and/or additional hardware, software, or firmware components beyond those described or depicted without departing from the scope of the invention. More particularly, it should be appreciated that software, firmware, or hardware components depicted as forming part of the VIRP server 502 are merely illustrative and that some components may or may not be present or additional components can be provided in various embodiments. While various illustrative modules have been depicted and described as software modules stored in data storage 520, it should be appreciated that functionality described as being supported by the modules can be enabled by any combination of hardware, software, and/or firmware. It should further be appreciated that each of the above-mentioned modules can, in various embodiments, represent a logical partitioning of supported functionality. This logical partitioning is depicted for ease of explanation of the functionality and may or may not be representative of the structure of software, hardware, and/or firmware for implementing the functionality. Accordingly, it should be appreciated that functionality described as being provided by a particular module can, in various embodiments, be provided at least in part by one or more other modules. Further, one or more depicted modules may or may not be present in certain embodiments, while in other embodiments, additional program modules and/or engines not depicted can be present and can support at least a portion of the described functionality and/or additional functionality.

One or more operations of the method 300 and/or the method 400 can be performed by a VIRP server 502 having the illustrative configuration depicted in FIG. 5, or more specifically, by one or more program modules, engines, applications, or the like executable on such a device. It should be appreciated, however, that such operations can be implemented in connection with numerous other device configurations. In addition, any of the functionality described in connection with the VIRP server 502 can be provided, at least in part, by one or more V2X communication devices 506.

The operations described and depicted in the illustrative method 300 of FIG. 3 and/or the illustrative method 400 of FIG. 4 can be carried out or performed in any suitable order as desired in various example embodiments of the invention. Additionally, in certain example embodiments, at least a portion of the operations can be carried out in parallel. Furthermore, in certain example embodiments, less, more, or different operations than those depicted in FIG. 3 and/or FIG. 4 can be performed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for real-time vehicular incident risk prediction and notification, the method comprising:
receiving first real-time vehicle-to-everything (V2X) data relating to operation of a vehicle on a first roadway segment;
executing a trained vehicular incident risk prediction machine learning model on the first real-time V2X data to obtain a first vehicular incident risk value indicative of a first vehicular incident risk level associated with the operation of the vehicle on the first roadway segment;
determining that the first vehicular incident risk value meets a first threshold risk value;
sending a notification of the first vehicular incident risk level to a communication device of the vehicle for presentation to an operator of the vehicle; and
generating a second threshold risk value for assessing a second vehicular risk value by modifying the first risk value based on second real-time V2X data.

2. The computer-implemented method of claim 1, further comprising:
segmenting a collection of roadways into a collection of roadway segments;
receiving input data relating to the collection of roadway segments, the input data comprising at least one of vehicular collision data, vehicle operator behavior data, environmental condition data, or infrastructure condition data; and
training the vehicular incident risk prediction machine learning model based at least in part on the input data.

3. The computer-implemented method of claim 2, wherein the vehicular collision data comprises data indicative of historical vehicular collisions on the collection of roadway segments, vehicle operator data comprises historical data indicative of driving patterns of a plurality of vehicle operators on the collection of roadway segments, the environmental condition data comprises data indicative of weather conditions in proximity to the collection of roadway segments, and the infrastructure condition data comprises data indicative of a geometry and operational status of the collection of roadway segments.

4. The computer-implemented method of claim 2, wherein the collection of roadway segments excludes the first roadway segment, and wherein executing the trained vehicular incident risk prediction machine learning model on the first real-time V2X data comprises determining, using the trained vehicular incident risk prediction machine learning model, that the first real-time V2X data is within a threshold level of similarity to a portion of the input data associated with a second roadway segment on which more than a threshold number of vehicular collisions occurred during a predetermined time period, the collection of roadway segments including the second roadway segment.

5. The computer-implemented method of claim 1, wherein the first real-time V2X data is received during a first time period and a second vehicular incident risk corresponds to the first time period, the method further comprising:
receiving the second real-time V2X data, the second real-time V2X data relating to operation of the vehicle on the first roadway segment during a second time period;
executing the trained vehicular incident risk prediction machine learning model on the second real-time V2X data to obtain a second vehicular incident risk value indicative of a second vehicular incident risk level associated with the operation of the vehicle on the first roadway segment during the second time period;
determining that the second vehicular incident risk value does not meet the second threshold risk value; and
sending an instruction to the communication device of the vehicle to cease presentation of the first incident risk level to the operator of the vehicle.

6. The computer-implemented method of claim 1, wherein sending the notification of the first vehicular incident risk level comprises sending information to the communication device for display to the operator of the vehicle, the information including indicia representative of the first vehicular incident risk level and an identification of one or more factors indicative of the first vehicular incident risk level, the one or more factors comprising at least one of a driving behavior factor, an environmental factor, or a roadway segment infrastructure factor.

7. The computer-implemented method of claim 1, further comprising:
receiving a continuous stream of real-time V2X data relating to operation of the vehicle on the first roadway segment;
executing the trained vehicular incident risk prediction machine learning model on the continuous stream of real-time V2X data to periodically determine a vehicular incident risk level associated with the operation of the vehicle on the first roadway segment; and
sending an indication of the vehicular incident risk level to the communication device of the vehicle to enable presentation of a dynamically changing indicia of the vehicular incident risk level to an operator of the vehicle.

8. The computer-implemented method of claim 1, wherein the first real-time V2X data is received via network transmissions from a plurality of in-vehicle communication devices over one or more cellular networks.

9. The computer-implemented method of claim 1, further comprising receiving real-time environmental condition data or infrastructure condition data, wherein the trained vehicular incident risk prediction machine learning model is further executed on the real-time environmental condition data or infrastructure condition data to obtain the first vehicular incident risk value.

10. A system for real-time vehicular incident risk prediction and notification, the system comprising:
at least one memory storing computer-executable instructions; and
at least one processor configured to access the at least one memory and execute the computer-executable instructions to:
receive first real-time vehicle-to-everything (V2X) data relating to operation of a vehicle on a first roadway segment;
execute a trained vehicular incident risk prediction machine learning model on the first real-time V2X data to obtain a first vehicular incident risk value indicative of a first vehicular incident risk level associated with the operation of the vehicle on the first roadway segment;

determine that the first vehicular incident risk value meets a first threshold risk value;

send a notification of the first vehicular incident risk level to a communication device of the vehicle for presentation to an operator of the vehicle; and generate a second threshold risk value for assessing a second vehicular risk value by modifying the first risk value based on second real-time V2X data.

11. The system of claim 10, wherein the at least one processor is further configured to execute the computer-executable instructions to:

segment a collection of roadways into a collection of roadway segments;

receive input data relating to the collection of roadway segments, the input data comprising at least one of vehicular collision data, vehicle operator behavior data, environmental condition data, or infrastructure condition data; and train the vehicular incident risk prediction machine learning model based at least in part on the input data.

12. The system of claim 11, wherein the vehicular collision data comprises data indicative of historical vehicular collisions on the collection of roadway segments, vehicle operator data comprises historical data indicative of driving patterns of a plurality of vehicle operators on the collection of roadway segments, the environmental condition data comprises data indicative of weather conditions in proximity to the collection of roadway segments, and the infrastructure condition data comprises data indicative of a geometry and operational status of the collection of roadway segments.

13. The system of claim 11, wherein the collection of roadway segments excludes the first roadway segment, and wherein the at least one processor is configured to execute the trained vehicular incident risk prediction machine learning model on the first real-time V2X data by executing the computer-executable instructions to determine, using the trained vehicular incident risk prediction machine learning model, that the first real-time V2X data is within a threshold level of similarity to a portion of the input data associated with a second roadway segment on which more than a threshold number of vehicular collisions occurred during a predetermined time period, the collection of roadway segments including the second roadway segment.

14. The system of claim 10, wherein the first real-time V2X data is received during a first time period and a second vehicular incident risk corresponds to the first time period, and wherein the at least one processor is further configured to execute the computer-executable instructions to:

receive the second real-time V2X data, the second real-time V2X data relating to operation of the vehicle on the first roadway segment during a second time period;

execute the trained vehicular incident risk prediction machine learning model on the second real-time V2X data to obtain a second vehicular incident risk value indicative of a second vehicular incident risk level associated with the operation of the vehicle on the first roadway segment during the second time period;

determine that the second vehicular incident risk value does not meet the second threshold risk value; and send an instruction to the communication device of the vehicle to cease presentation of the first incident risk level to the operator of the vehicle.

15. The system of claim 10, wherein the at least one processor is configured to send the notification of the first vehicular incident risk level by executing the computer-executable instructions to send information to the communication device for display to the operator of the vehicle, the information including indicia representative of the first vehicular incident risk level and an identification of one or more factors indicative of the first vehicular incident risk level, the one or more factors comprising at least one of a driving behavior factor, an environmental factor, or a roadway segment infrastructure factor.

16. The system of claim 10, wherein the at least one processor is further configured to execute the computer-executable instructions to:

receive a continuous stream of real-time V2X data relating to operation of the vehicle on the first roadway segment;

execute the trained vehicular incident risk prediction machine learning model on the continuous stream of real-time V2X data to periodically determine a vehicular incident risk level associated with the operation of the vehicle on the first roadway segment; and send an indication of the vehicular incident risk level to the communication device of the vehicle to enable presentation of a dynamically changing indicia of the vehicular incident risk level to an operator of the vehicle.

17. The system of claim 10, wherein the first real-time V2X data is received via network transmissions from a plurality of in-vehicle communication devices over one or more cellular networks.

18. The system of claim 10, wherein the at least one processor is further configured to execute the computer-executable instructions to:

receive real-time environmental condition data or infrastructure condition data; and further execute the trained vehicular incident risk prediction machine learning model on the real-time environmental condition data or infrastructure condition data to obtain the first vehicular incident risk value.

19. A non-transitory computer-readable storage medium storing instructions executable by a processing circuit to cause a method for real-time vehicular risk prediction and notification to be performed, the method comprising:

receiving first real-time vehicle-to-everything (V2X) data relating to operation of a vehicle on a first roadway segment;

executing a trained vehicular incident risk prediction machine learning model on the first real-time V2X data to obtain a first vehicular incident risk value indicative of a first vehicular incident risk level associated with the operation of the vehicle on the first roadway segment;

determining that the first vehicular incident risk value meets a first threshold risk value;

sending a notification of the first vehicular incident risk level to a communication device of the vehicle for presentation to an operator of the vehicle; and generating a second threshold risk value for assessing a second vehicular risk value by modifying the first risk value based on second real-time V2X data.

20. The non-transitory computer-readable medium of claim 19, the method further comprising:

segmenting a collection of roadways into a collection of roadway segments;

receiving input data relating to the collection of roadway segments, the input data comprising at least one of vehicular collision data, vehicle operator behavior data, environmental condition data, or infrastructure condition data; and
training the vehicular incident risk prediction machine learning model based at least in part on the input data.

* * * * *